W. V. TURNER.
FLUID PRESSURE BRAKE.
APPLICATION FILED JUNE 27, 1906.
1,085,771.
Patented Feb. 3, 1914.
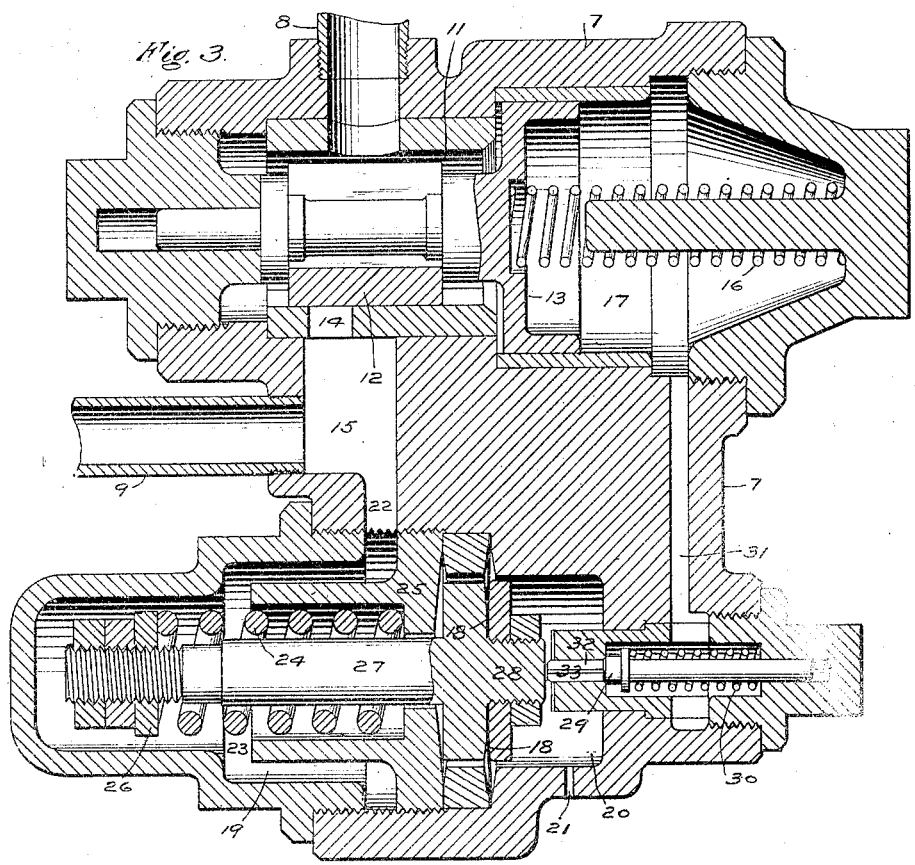
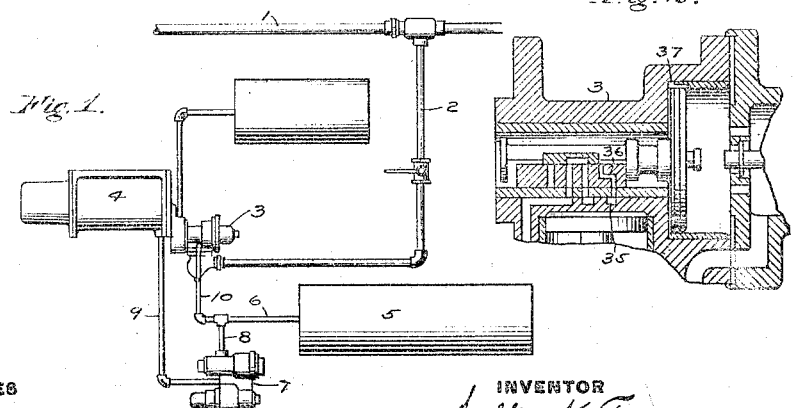
WITNESSES
INVENTOR
Walter V. Turner
by E. Wright
Att'y.

UNITED STATES PATENT OFFICE.

WALTER V. TURNER, OF EDGEWOOD, PENNSYLVANIA, ASSIGNOR TO WESTINGHOUSE AIR BRAKE COMPANY, OF PITTSBURGH, PENNSYLVANIA, A CORPORATION OF PENNSYLVANIA.

FLUID-PRESSURE BRAKE.

1,085,771. Specification of Letters Patent. Patented Feb. 3, 1914.

Application filed June 27, 1906. Serial No. 323,609.

*To all whom it may concern:*

Be it known that I, WALTER V. TURNER, a citizen of the United States, residing at Edgewood, in the county of Allegheny and State of Pennsylvania, have invented certain new and useful Improvements in Fluid-Pressure Brakes, of which the following is a specification.

My invention relates to automatic fluid pressure brakes for railway cars, and has for its principal object to provide new and improved means for augmenting the pressure in the brake cylinder in emergency applications of the brakes.

My invention provides means operative by brake cylinder pressure for charging fluid under pressure into the brake cylinder to augment the pressure therein when a certain degree of pressure already exists in the brake cylinder; and it is specially adapted to be employed for augmenting the brake cylinder pressure in emergency applications of the brakes.

It also comprises various improved features of construction and operation, as hereinafter set forth.

In the accompanying drawings, which illustrate an application of my invention, Figure 1 is a diagrammatic view of an ordinary form of brake apparatus with my improvement applied thereto; Fig. 2 a fragmentary sectional view of the triple valve, showing means for charging the supplemental reservoir; and Fig. 3 a central section, on a large scale, through the valvular apparatus of my invention.

In Fig. 1 of the drawings, my improvement is shown in combination with a Westinghouse quick-action, or emergency, brake apparatus comprising the train pipe, 1, branch pipe 2, emergency triple valve, 3, and brake cylinder, 4. My improvement provides, in addition to this usual form of apparatus, an additional source of air under pressure, such as a supplementary reservoir, 5, and a valve device, 7, having connection with the supplementary reservoir through pipes 8 and 6, and with the brake cylinder through pipe 9. The supplemental reservoir may be charged in any desirable manner, but in Figs. 1 and 2 of the drawings it is shown connected with the triple valve device, 3, through which it may be charged with fluid under pressure from the train pipe through feed groove 37, and ports 36 and 35 in the slide valve and seat when the triple valve is in release position. The port 35 communicates with the pipe 10 and the supplemental reservoir.

The supplementary reservoir, 5, is at all times in open communication with the chamber 11, within the casing of the valve device 7, through the pipe 8, as shown in Fig. 3; and a valve 12, in the chamber 11 controls communication between that chamber and the brake cylinder, through port 14, passage 15, and pipe 9. The valve 12 is held in its normal, or closed, position by the pressure of the spring 16 and the pressure of the fluid in the chamber 17 on the right of the piston 13; the chamber 17 being charged with fluid under pressure which passes around the piston from chamber 11.

A diaphragm 18 within the casing 7 is exposed on one side to the pressure in chamber 20, which is open to the atmosphere through the port 21, and on the other side the diaphragm is exposed to the pressure in chamber 23 which is at all times in open communication with the brake cylinder through passages 22 and 15 and pipe 9. A spring, 24, which bears at one end on the fixed abutment 25 and at the other end against a bearing, 26, on the diaphragm stem 27, normally holds the diaphragm in its position to the left so that the projection or extension 28 will be out of contact with the stem 33 of the valve 29 which controls communication between a passage 31 and the chamber 20 which is open to the atmosphere through port 21.

The release valve 29, which is provided with a spring 30, is normally seated, and then it closes communication between the chamber 17 and the atmosphere, and serves to retain fluid under pressure in the chamber 17. When the valve 29 is unseated it releases fluid under pressure from passage 31 and chamber 17, to the atmosphere, through passage 32, chamber 20 and port 21.

The spring 24 is so adjusted that it prevents movement of the diaphragm 18 to the right in full service applications of the brake, but when a higher degree of pressure exists in the brake cylinder, as in emergency applications, the higher brake cylinder pressure acting on the diaphragm compresses the spring 24, and, as the diaphragm is moved to the right, the projection 28 comes in contact with the stem 33 and unseats valve 29. Fluid under pressure is then released from chamber 17, through passages 31, 32, chamber 20, and port 21, to the atmosphere. Piston 13 and valve 12 are then moved to the right by the fluid under pressure in chamber 11, and fluid under pressure from the supplementary reservoir flows through pipe 8, chamber 11, port 14, passage 15, and pipe 9 to the brake cylinder, thereby augmenting the pressure therein until the pressure in the brake cylinder and supplemental reservoir are equalized. When pressure in the brake cylinder is reduced below the emergency pressure necessary to cause unseating of the valve 29, that valve closes and cuts off communication between the chamber 17 and the atmosphere, and thereupon the spring 16 acting on the piston 13 will move the piston and valve 12 to the left and cut off communication between the brake cylinder and supplemental reservoir. The spring 16 may be so adjusted as to close the valve 12 when any desired degree of reduction of pressure has been effected in the supplemental reservoir, and this adjustment may depend on the degree of pressure normally existing in the supplementary reservoir; for example, if an excessive pressure, say 90 pounds, normally exists in the supplemental reservoir, as may be the case when it is charged otherwise than through the ordinary train pipe, it may be desirable to close the valve 12 before supplemental reservoir and brake cylinder pressures are equalized.

Having now described my invention, what I claim as new, and desire to secure by Letters Patent, is:—

1. In a fluid pressure brake apparatus, the combination, with a brake cylinder and a reservoir, of means operative by brake cylinder pressure for charging fluid under pressure from the reservoir into the brake cylinder.

2. In an automatic fluid pressure brake apparatus, the combination, with a brake cylinder and a reservoir, of means operative by brake cylinder pressure for charging fluid under pressure from the reservoir into the brake cylinder.

3. In a fluid pressure brake apparatus, the combination, with a brake cylinder and a source of fluid under pressure, of means, operative by brake cylinder pressure, for charging fluid under pressure from the source of pressure into the brake cylinder.

4. In an automatic fluid pressure brake apparatus, the combination, with a brake cylinder, an auxiliary reservoir and a triple valve, of means, operative by brake cylinder pressure, for charging fluid under pressure from a source of pressure into the brake cylinder.

5. In an automatic fluid pressure brake apparatus, the combination, with a brake cylinder, an auxiliary reservoir and a triple valve, of a supplemental reservoir and means operative by brake cylinder pressure for charging fluid under pressure from the supplemental reservoir into the brake cylinder.

6. In an automatic fluid pressure brake apparatus, the combination, with a brake cylinder, an auxiliary reservoir and a triple valve, of a supplemental reservoir and a valve device actuated by brake cylinder pressure for charging fluid under pressure from the supplemental reservoir into the brake cylinder.

7. In a fluid pressure brake apparatus, the combination, with a brake cylinder and means for effecting an emergency application of the brakes, of means operative by brake cylinder pressure for charging fluid under pressure from a source of pressure into the brake cylinder.

8. In a fluid pressure brake apparatus, the combination, with a brake cylinder and means for effecting an emergency application of the brakes, of means operative by emergency pressure in the brake cylinder for augmenting the pressure in the brake cylinder.

9. In an automatic fluid pressure brake apparatus, the combination, with a brake cylinder, an auxiliary reservoir and an emergency valve device, of means, operative by emergency pressure in the brake cylinder for augmenting the pressure in the brake cylinder.

10. In an automatic fluid pressure brake apparatus, the combination, with a brake cylinder, an auxiliary reservoir and an emergency valve device, of a supplemental reservoir, a charging valve controlling communication between the supplemental reservoir and the brake cylinder, and a valve device operative by brake cylinder pressure for controlling and operating the charging valve.

11. In an automatic fluid pressure brake system, the combination, with a brake cylinder and an auxiliary reservoir, of a supplemental reservoir, a charging valve controlling communication between the supplemental reservoir and the brake cylinder, a piston exposed to fluid under pressure and connected with the charging valve, a release valve for releasing fluid under pressure from one side of the piston for effecting operation of the charging valve, and a movable abutment or diaphragm actuated by brake cylinder pressure for operating the release valve.

12. In an automatic fluid pressure brake system, the combination, with a brake cylinder, an auxiliary reservoir and an emergency valve device, of a supplementary reservoir, a charging valve controlling communication between the supplemental reservoir and the brake cylinder, a piston exposed to fluid under pressure and connected with the charging valve, a release valve for releasing fluid under pressure from one side of the piston for effecting operation of the charging valve, and a movable abutment or diaphragm actuated by emergency pressure in the brake cylinder for operating the release valve.

13. The combination, with a source of fluid under pressure, of a receptacle, or vessel, for containing fluid under pressure, and means whereby pressure within the receptacle or vessel may operate to open communication between the source of fluid under pressure and the receptacle, or vessel, and thereby effect an increase of pressure in the vessel.

14. The combination, with a receptacle, or vessel, and means for supplying fluid under pressure thereto, of a supplemental source of fluid under pressure, and means whereby pressure within the receptacle, or vessel, may operate to open communication with the supplemental source and thereby effect an increase of pressure in the receptacle, or vessel.

15. In a fluid pressure brake, the combination, with a brake cylinder, of means for supplying fluid under pressure thereto in service and emergency applications of the brake, and a source of fluid under pressure which is closed to the brake cylinder in service applications of the brake, but which is put in communication therewith in emergency applications by means operative by brake cylinder pressure.

16. In an automatic fluid pressure brake, the combination with a brake cylinder and a reservoir, of a valve-mechanism operated at a predetermined degree of fluid pressure in the brake cylinder for opening communication from said reservoir to said brake cylinder.

17. In a fluid pressure brake, the combination with a brake cylinder, auxiliary reservoir, means for supplying fluid from the auxiliary reservoir to the brake cylinder, of a supplemental reservoir, a valve for controlling the admission of fluid from said supplemental reservoir to the brake cylinder, an actuating piston therefor, normally subject on opposite sides to fluid under pressure, and means for varying the fluid pressure on one side of said piston to actuate said valve.

18. In a fluid pressure brake, the combination with a brake cylinder, and a supplemental reservoir, of a valve for controlling the admission of fluid from said supplemental reservoir to the brake cylinder, an actuating piston therefor, subject to fluid under pressure, and means, subject to the opposing pressures of the brake cylinder and a spring, for releasing fluid from one side of said piston, to actuate said valve, and a spring for closing said valve upon equalization of fluid pressures on said piston.

19. In a fluid pressure brake, the combination with a brake cylinder, auxiliary reservoir, and triple valve, of a supplemental reservoir and means subject to the opposing pressures of the supplemental reservoir and a spring for controlling communication between said supplemental reservoir and the brake cylinder.

In testimony whereof I have hereunto set my hand.

WALTER V. TURNER.

Witnesses:
R. F. EMERY,
J. B. MACDONALD.